Patented Mar. 24, 1925.

1,530,841

UNITED STATES PATENT OFFICE.

KARL MARX, OF BERLIN-DAHLEM, AND HANS WESCHE, OF DESSAU, GERMANY, ASSIGNORS TO ACTIEN GESELLSCHAFT FÜR ANILIN FABRIKATION, OF BERLIN.

DISINFECTING SEED GRAIN.

No Drawing. Application filed June 27, 1924. Serial No. 722,877.

*To all whom it may concern:*

Be it known that we, KARL MARX and HANS WESCHE, citizens of the German Republic, residing at Berlin-Dahlem, Germany, and Dessau in Anh., Germany, have invented certain new and useful Improvements Relating to Disinfecting Seed Grain, of which the following is a specification.

It is known that organic mercury compounds soluble in alkali are useful for disinfecting seed grain. The salts of hydrocyanic acid and of hydroferrocyanic acid on the other hand have no fungicidal effect and grain treated with these compounds shows a remarkable reduction of the germinating power.

According to this invention the fungicidal effect of the mercury organic compounds which are used in an alkaline solution may be greatly increased by addition of a salt of an acid containing the cyanogen group, for instance of the hydrocyanic acid, hydroferrocyanic acid, etc. If, for instance, the spores of *Tilletia tritici* are treated with an alkaline solution of 0.25 per cent strength of mercuric para-cresol the spores are not destroyed completely after treatment for an hour. If, however, the fungicide contains for instance 100 parts of the sodium compound of mercuric para-cresol, and 60 parts of potassium ferrocyanide the spores are destroyed quickly when treated under the same conditions. Potassium cyanide may be substituted for the potassium ferrocyanide with like result. A solution of potassium ferrocyanide or of potassium cyanide of 1 per cent strength does not have any disinfecting effect.

Wheat and barley which had been treated with a solution of mercuric para-cresol germinated after ten days only to the extent of 94 to 95 per cent; whereas wheat and barley treated with the new mixture germinated under like conditions to the extent of 98 to 99 per cent.

What we claim is—

1. A method of disinfecting seed grain which consists in treating the grain with a mixture of a mercury organic compound and a salt of an inorganic acid containing the cyanogen group.

2. Mixtures for disinfecting grain for sowing containing a mercury organic compound and a salt of an inorganic acid containing the cyanogen group.

In testimony whereof we affix our signatures in presence of two witnesses.

KARL MARX.
DR. HANS WESCHE.

Witnesses:
RUDOLPH FRICKS,
WILLY SHER.